Nov. 23, 1954　　　F. F. SUELLENTROP　　　2,695,123
APPARATUS FOR MANUFACTURING WHIPPED CREAM
Filed March 25, 1954　　　3 Sheets-Sheet 1
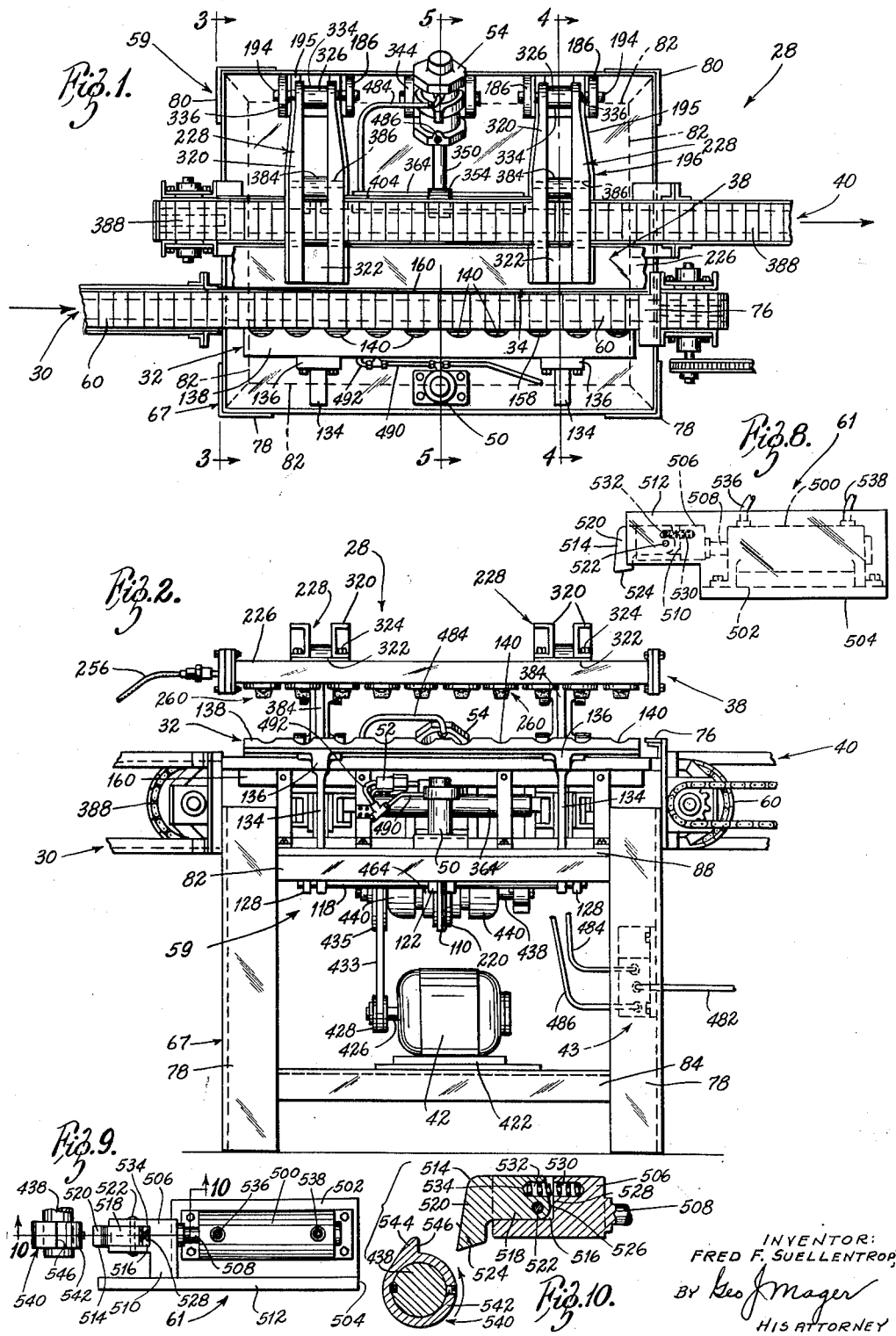
INVENTOR:
FRED F. SUELLENTROP,
BY Geo. J. Mager
HIS ATTORNEY

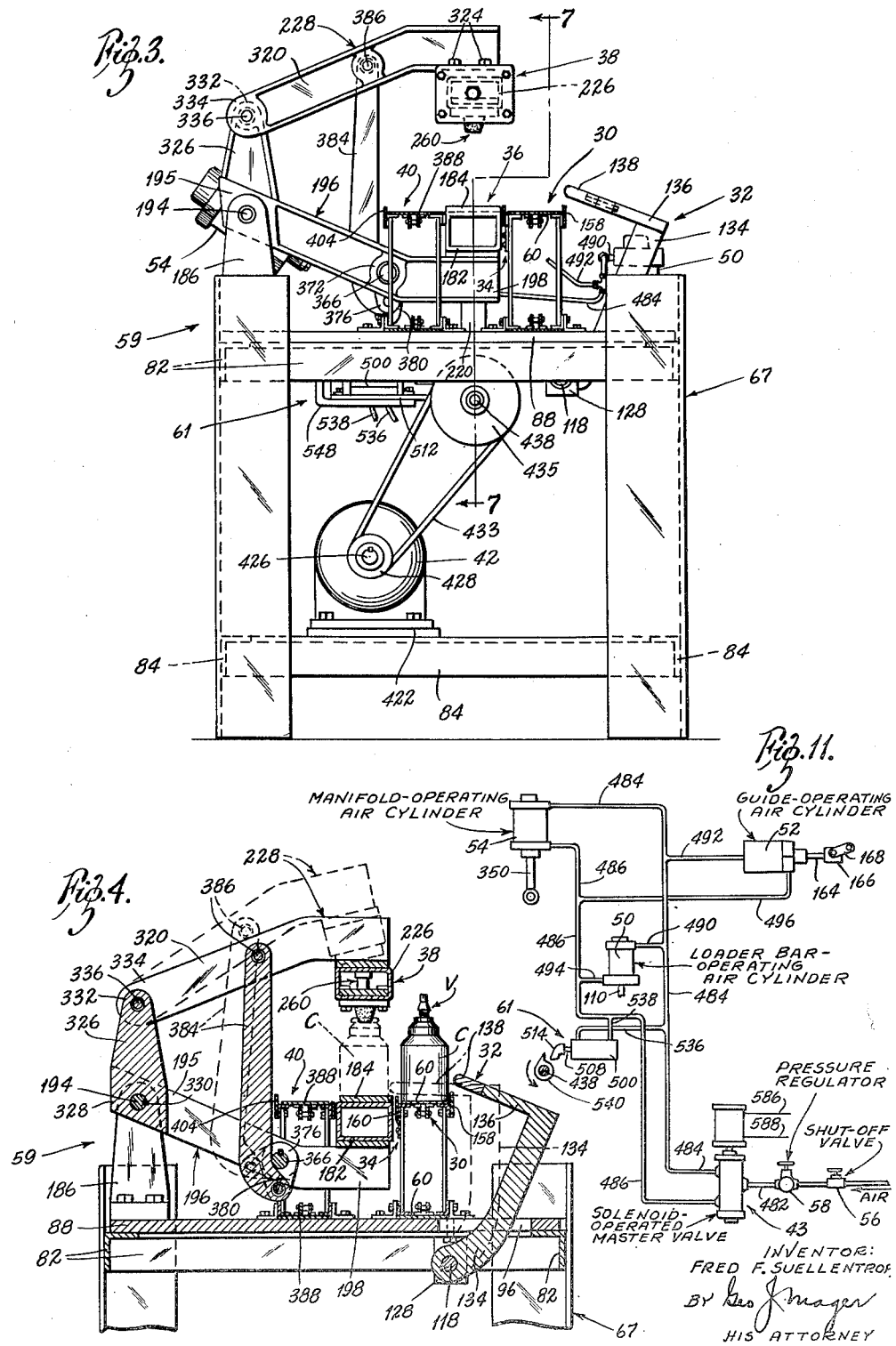

Nov. 23, 1954    F. F. SUELLENTROP    2,695,123
APPARATUS FOR MANUFACTURING WHIPPED CREAM
Filed March 25, 1954    3 Sheets-Sheet 3
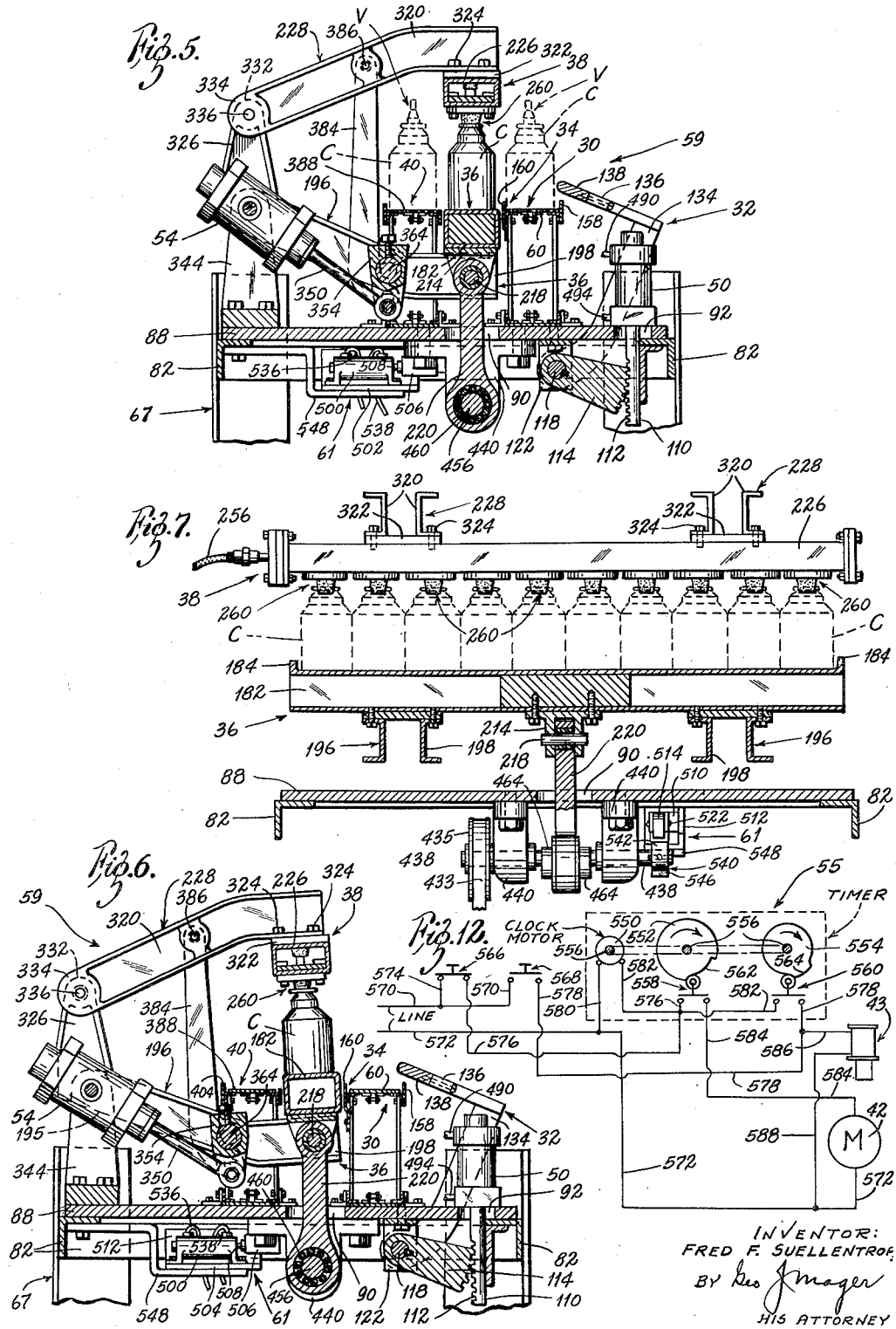

United States Patent Office 2,695,123
Patented Nov. 23, 1954

2,695,123

APPARATUS FOR MANUFACTURING WHIPPED CREAM

Fred F. Suellentrop, Lemay, Mo., assignor to Lemay Machine Company, Lemay, Mo., a corporation of Missouri Application March 25, 1954, Serial No. 418,523

4 Claims. (Cl. 226—72)

The present invention relates generally to the manufacture of whipped cream in handy containers designed primarily for domestic purposes. That is to say, the invention is directed to apparatus for fluffing or whipping a quantity of pasteurized cream within each of a plurality of self-dispensing containers, simultaneously with the introduction into each container of a gas under specified pressure, as will appear.

In United States Letters Patent No. 2,584,063, issued to me on January 29, 1952, entitled Apparatus for Manufacturing Whipped Cream, there is set forth in detail a description of the method, and an apparatus employed in practicing the method.

The present invention contemplates no critical change in the method set forth in said patent, and is directed solely to improvements in the container-reciprocating and gas-injecting apparatus employed.

Specifically, the present invention is directed to improvements in the apparatus disclosed in United States Letters Patent No. 2,594,492, likewise entitled Apparatus for Manufacturing Whipped Cream, granted jointly to Norman J. Pfeiffer and to me on April 29, 1952.

Broadly, the apparatus disclosed in the last-named patent includes a first continuously operating conveyor for delivering cream containers to a machine; means for transferring a plurality of the containers from said conveyor onto a vertically reciprocable bed member; a retractible barrier strip or container guide normally positioned between the adjacent edge portions of said conveyor and said bed member; a gas injection assembly adapted to releasably maintain the containers in place during the gas injection and simultaneous reciprocation thereof; a second continuously operating conveyor for transporting or discharging processed containers from the machine; means for transferring processed containers from said bed onto the said discharge conveyor; and means for effecting the various operations sequentially, continuously, and automatically.

In accordance with the disclosures of said patent, after the containers have been loaded thereonto, the bed member is reciprocated vertically and rapidly for a specified period of time, whereupon said bed member automatically comes to rest in such fashion that the upper surface thereof is co-planar with the corresponding surfaces of the two conveyors. In consequence of this behavior, the transfer of processed cans from the bed member onto the discharge conveyor may be effected by the concurrent transfer of non-processed containers from the delivery conveyor onto the bed member, whereupon the reloaded bed member may again be reciprocated automatically, all as set forth clearly in said Letters Patent No. 2,594,492.

Further as disclosed in said Letters Patent, these automatic operations were controlled by a clutch mechanism that operated responsive to the action of an air cylinder, the action of this air cylinder being in turn controlled by a master air valve in conjunction with a metering valve.

Inasmuch as the demand for the ultimate product has been high, many dairies have found it necessary to operate the disclosed apparatus continuously for long periods of time. In consequence it has been found, that the approximately four clutch operations per minute required in these continuous operations have been prone to cause clutch wear and attendant clutch malfunctioning.

In United States Letters Patent No. 2,683,558, issued to me on July 13, 1954, novel means are disclosed adapted to overcome the disadvantages set forth in the preceding paragraph. That is to say, in accordance with the teachings set forth in said patent, means are provided in lieu of said clutch mechanism and elements associated therewith, for controlling the functional operations of the bed member, without requiring other changes in the earlier patented apparatus.

The present invention has for its primary objective the provision of further novel improvements to the end that the entire operation of the apparatus may be automatically controlled by an electrically operable timer device that eliminates not only the clutch mechanism of Patent No. 2,594,492 aforesaid, but also dispenses with the continuously operating transmission and speed reducer unit disclosed in said Patent No. 2,683,558, and the plate cam and micro-switch arrangement associated with said unit.

In consequence of the present disclosure, the master valve that controls the air pressure-effected functions of the apparatus is operated by means of a solenoid activated intermittently in response to rotations of a clock motor shaft. Said clock motor is incorporated in a timer mechanism, and the motor shaft has cams affixed thereto adapted to successively close a pair of normally open switches. Closing of the first of these switches serves to energize the motor that effects the reciprocations of the bed member. Closing of the second of these switches serves to energize said solenoid, the cams aforesaid being so designed as to first initiate and then terminate these operations in proper sequence, as will appear.

An important advantage resultant in consequence of the timer mechanism control of operations resides in increased productivity. That is to say, inasmuch as the functioning of the apparatus is positively controlled by electrical energy as will appear, the sequence of operations may be accelerated somewhat, so that a batch of containers may be processed in twenty seconds, provided the temperature of the cream initially introduced into said containers is slightly below that recommended in the patents aforesaid.

As pointed out in said patents, the predetermined distribution of weight in the agitation mechanism is so designed that normally the upper surface of the bed member will automatically come to rest in a horizontal plane that is level with that of the upper surfaces of the container delivery and discharge conveyors. Although rarely, it does happen that the motor which effects the reciprocal movements of the bed member stops on what is called "dead center," in which event the weight distribution may be ineffectual.

The present invention provides a novel air cylinder-operated device that, in cooperation with a cam-shaped element rigid with a shaft driven by said motor, positively assures the co-planar disposition of the bed member upper surface relatively to the corresponding surfaces of said conveyors at the end of each cycle of container agitation. A compression spring arrangement is included in said device to safeguard against injury to components thereof in the event of malfunctioning of the timer mechanism.

This invention also provides a manually operable switch adapted to energize the solenoid of the master valve independently of the timer mechanism for a reason and in a manner to be hereinafter explained.

The containers wherein the cream is processed are of the same type illustrating and described but not claimed in said patents. The invention is illustrated in three sheets of drawings that accompany this specification, and in the description to follow with respect to these drawings, the same reference characters are employed to designate elements common to the patent disclosures aforesaid.

In said drawings:

Figure 1 is a top plan view of the apparatus of the present invention, the end portions of a gas injection manifold being broken away to more clearly demonstrate the structure therebelow, and the container delivery and discharge conveyors being shown fragmentarily;

Figure 2 is a front elevational view thereof;

Figure 3 is a left end elevational view, partly in section and on an enlarged scale, taken as indicated approximately on the line 3—3 of Figure 1;

Figure 4 is a vertical sectional view taken along the line 4—4 of Figure 1, the scale of this view corresponding to that of Figure 3;

Figure 5 is a vertical sectional view taken approximately on the line 5—5 of Figure 1, the scale of this view corresponding to that of Figures 3 and 4;

Figure 6 is a view similar to Figure 5 with certain parts in an alternate position;

Figure 7 is a view partly in elevation and partly in vertical section, this view being taken along the line 7—7 of Figure 3 with some elements which would appear in the background being omitted in the interest of clarity;

Figure 8 is a side elevational view of an air cylinder operated device that cooperates with a cam-shaped element to automatically and positively assure the co-planar disposition of the bed member relatively to the conveyors at the termination of each cycle of container agitation;

Figure 9 is a top plan view of Figure 8, said cam-shaped element being included in this view;

Figure 10 is a vertical sectional view, on an enlarged scale, taken on the line 10—10 of Figure 9;

Figure 11 is a diagrammatical layout of the air control system; and

Figure 12 is a diagrammatical layout of the electrical system.

In Figures 1 and 2, the apparatus for manufacturing whipped cream is designated as a whole by the numeral 28. The apparatus 28 is designed to be interposed between a mechanism employed to introduce a specific quantity of cream into the containers, and a cold storage room or the like for the processed containers.

The apparatus includes container delivery conveyor mechanism generally designated 30; container transfer or loading mechanism generally indicated at 32; retractible container guide mechanism generally indicated at 34; a reciprocable container-supporting bed assembly generally designated 36; a reciprocable gas injection assembly generally indicated at 38; container discharge conveyor mechanism generally indicated at 40; a motor 42; a solenoid-operated master air control valve assembly 43; a first air pressure operated cylinder 50 associated with said transfer mechanism 32; a second air pressure operated cylinder 52 associated with said container guide mechanism 34; a third air pressure operated cylinder 54 associated with said gas injection assembly 38; a timer device 55, appropriately mounted on a wall panel board adjacent the apparatus 28, for controlling the operations of the solenoid valve assembly 43; a gas shut-off valve 56; a gas pressure regulator 58; an air cylinder operated unit generally designated 61; and driving connections, supporting structure, electrical wiring, switches, and other elements to be described hereinafter.

As set forth in detail in the first named patent aforesaid, a specific quantity of high quality pasteurized cream is first introduced into each container C, whereupon a valve assembly V, of the type also described in said first named patent and the aforesaid Patent No. 2,594,492 is affixed thereto. Thereupon, the containers are delivered from the filling station to the processing machine 59 of apparatus 28, by means of a plate type endless conveyor 60 included in the mechanism 30. The conveyor 60 is horizontally disposed for longitudinal travel across the machine 59, being operatively supported from the framework 67 of said machine in the manner clearly described in said patents and in the co-pending application. As shown especially in Figure 1, an abutment or stop member 76 that extends across the conveyor 60 in vertically spaced relation thereto, is also included in the container delivery mechanism 30.

The framework 67 of the machine 59 includes a pair of front corner standards 80, upper front, rear, and side angle bars 82, and corresponding lower angle bars 84, all of these members being welded together to provide a rigid supporting structure.

Supported on the inturned flanges of the upper angle bars 82 is a rectangular base plate 88 provided with circular openings 90 and 92 and a pair of spaced elongated slots 96, as best seen in Figures 4 through 6.

The loading mechanism 32 includes the air cylinder 50 which is mounted on the base plate 88 and has a depending piston rod 110 that extends through the opening 92 of said base plate. A rack 112 formed in said piston rod is in constant engagement with a segmental gear 114.

This gear is keyed to a horizontal rock shaft 118 between the depending leg portions of an inverted U-shaped bearing member 122 that rotatably supports said shaft, the bearing being mounted on the underside of the base plate 88. Each end portion of the shaft 118 is rotatably supported in a bearing member 128 also mounted on the underside of said base plate as shown.

Rigidly secured to the rock shaft 118 is a pair of longitudinally spaced rocker arms 134, each terminating at its free end in a rearwardly projecting flange portion 136. As best seen in Figure 4, each arm 134 extends through one of the elongated slots 96 and normally occupies the position demonstrated. Inasmuch as the machine 59 is designed to simultaneously process ten containers, a loading bar 138 having ten arcuate recesses 140 formed therein, is rigidly secured to the flange portions 136.

As hereinbefore noted, the delivery conveyor 60 travels longitudinally across the machine 59 in a horizontal plane. A guide or retainer plate 158 is provided to maintain the containers in alignment on the conveyor, and the conveyor is operatively supported in the manner and by the means illustrated in the drawings. It is not deemed necessary to describe this supporting structure in detail herein, inasmuch as it has been comprehensively described in the prior disclosures referred to hereinbefore. Nor is the retractible container guide mechanism 34 illustrated and described herein in detail, said mechanism being identical with that disclosed in the joint patent. The mechanism 34 includes a vertically movable guide plate 160; the aforesaid air cylinder 52 and its piston rod 164; a head 166 rigid on the outer end of said piston rod; and a link 168 that is pivotally connected at one end to said head, and at the other end to the guide plate 160, whereby the latter may be raised and lowered.

The assembly 36 supports a batch of ten containers C immediately prior to, during, and immediately subsequent to an agitation operation. The bed member 182 of this assembly is in the form of a rectangular tube provided at both ends with an upwardly projecting abutment 184, as seen in Figure 7. Pivotally supported on pins 194 in a pair of spaced bearing brackets 186 that are mounted adjacent the rear marginal edge of the base plate are the rear end portions 195 of a pair of composite arms 196, the forward free end portions 198 of said arms being normally horizontally disposed beneath the bed member 182. A wrist pin connection 214 is secured centrally thereof to the bottom wall of the bed member, and numeral 218 designates a wrist pin that is supported in said connection and passes through the upper end of a connecting rod 220. As shown in the drawings, the connecting rod extends freely through said opening 90 in the base plate 88.

The gas injection assembly 38 includes a manifold 226 that is secured to the free ends of a pair of horizontally spaced composite arms each generally designated 228. It is not considered necessary to describe the manifold 226 in detail herein, since its construction and operation is fully set forth in said joint patent. It is sealed at both ends, and gas under pressure of ninety pounds per square inch is supplied thereto from a source of supply via the flexible conduit 256. The manifold 226 carries a plurality of ten spaced injection nozzle assemblies that are generally designated 260, and means are provided to seal the manifold against leakage of gas about these assemblies also.

With particular reference now to Figures 1, 2, and 7, each of the arms 228 comprises a pair of spaced similar channel-shaped members 320, each pair being rigidly connected together by means of a plate 322 and tap screws 324 that engage threaded apertures provided in the top wall 316 of the manifold. With these arrangements, it should be apparent that the manifold 226 is rigidly secured to and supported by the free end portions of the arms 228.

With reference especially now to Figures 3 through 6, numerals 326 designate a pair of vertically disposed links of the configuration shown. The lower portion 328 of each link is disposed between, and embraced by, a pair of rear end portions 195 of the arms 196 included in assembly 36. Pivot pin 194 also passes through said link, and the latter and said arms are rigidly secured together by any suitable means, a key 330 being illustrated. The upper ends 332 of said links are each disposed between and in contact with the rear end portions 334 of the pair of arms 228, a pivot pin 336 passing through said link and said arms.

The alternate rise and descent of the gas injection assembly 38 is controlled by the air cylinder 54. This air cylinder is trunnion-mounted in a bracket 344 that is secured to the base plate 88 by means of tap bolts, and it has a projecting piston rod 350. The free extremity of said rod has a pivotal connection with a clevis 354 that is rigidly secured to a rock shaft 364, the end portions 366 of the rock shaft being supported in bearing bosses 372 provided therefor in the aforesaid composite arms 196. A link 376 is rigidly secured to each end portion 366 of the rock shaft adjacent the arms 196, and the depending free end 380 of each link has a pivotal connection 382 with the lower end of a lever 384. There are two levers 384, and each of them also has a pivotal connection 386 at its upper end with one of the composite arms 228.

The discharge mechanism 40 includes a plate type endless conveyor 388 that is horizontally disposed co-planar with the conveyor 60, and also travels longitudinally across the machine 59. The supporting structure for the conveyor 388, although illustrated in the drawings, will also not be described herein in detail. A guide plate 404 is provided that serves to maintain in alignment on conveyor 388 the processed containers that are transferred thereonto in a manner to appear.

The motor 42 is mounted on a platform 422 supported from the horizontal flanges of the lower angle bars 84. Attached to the motor shaft 426 is a pulley 428 having a driving connection 433 with a pulley 435 that is rigidly affixed to a shaft 438 supported in spaced hanger bearings 440.

Intermediate the bearing hangers 440, shaft 438 has formed thereon an accentric or crank portion 456, which passes through a circular opening in the bottom end of connecting rod 222. An annular series of small roller bearings 460 is provided, the bearings being maintained in place by suitable retainer disks interposed between the end faces of the connecting rod, and annular shoulder portions 464 integrally formed on the shaft 438.

As previously noted, an important object of the present invention is to provide means for insuring the co-planar disposition of the bed member upper surface relatively to the similar surfaces of the conveyors 60 and 388, following the completion of each agitation operation. To attain this objective, the invention provides the novel air pressure operated unit 61 that is portrayed particularly in Figures 8 through 10.

The unit 61 includes: an air cylinder 500 securely mounted on the horizontal leg segment 502 of an angle member 504; a guide block 506 rigid with the projecting piston rod 508 of said cylinder; a lateral extension 510 integral with the guide block and slideably disposed against the vertical leg segment 512 of said angle member; and a hammer member 514. As seen in Figure 10, the guide block is internally recessed at 516, and the hammer member 514 is of substantially L-shaped configuration, including a horizontally disposed leg segment 518, and a generally vertically disposed leg segment 520. The segment 518 lies within the recess 516, and is pivotally mounted therein on a transverse pin 522, whereas the segment 520 extends beyond one end of the guide block 506 to terminate in a depending portion provided with a beveled face designated by the numeral 524. The inner end face 526 of the segment 518 is rounded about the pivot pin 522 as shown, and flares obliquely away from the inner wall 528 of the recess 516. Horizontally aligned circular cavities 530 and 532 are formed respectively in the guide block and the hammer member. A compression spring 534 disposed in said cavities biases said hammer member to the position thereof shown.

The unit 61 is incorporated in the compressed air system that is diagrammatically portrayed in Figure 11, the cylinder 500 being connected into said system by means of branch air lines 536 and 538. The hereinbefore mentioned cam-shaped element, designated by the numeral 540, is in the form of a collar 542 rigidly secured to that end of the crankshaft 438 opposite the end whereon the pulley 435 is affixed. Integrally formed with said collar is a projecting lug 544 having a flat radially disposed face 546.

The unit 61 is preferably supported from the framework 67 in operative disposition relatively to the element 540 by means of an angular bracket 548 shown in Figures 5 and 6, or in any other appropriate manner.

The timer 55 is schematically shown in the wiring diagram of Figure 12. It includes a clock motor 550 that has a first generally circular cam plate 552 and a second similar cam plate 554 affixed to its shaft 556; a normally open switch 558 that controls the action of the motor 42 in response to the rotation of cam plate 552; and a normally open switch 560 that controls the action of the solenoid master valve 43. The clock motor 550 is so regulated that its shaft 556 completes three revolutions per minute. Thus the cam plates 552 and 554 complete one revolution in twenty seconds. The first cam plate 552 has a recess 562 formed along approximately 72 degrees of its periphery, so that as will appear, the switch 558 is open four seconds, and closed sixteen seconds during each revolution of said first cam plate. The second cam plate 554 has a lobe 564 formed along approximately 54 degrees of its periphery, so that as will appear, the switch 560 is open seventeen seconds during each revolution of said second cam plate.

Numeral 566 designates a main manually operable switch, and numeral 568 designates a similar auxiliary switch included in the electrical system depicted schematically in Figure 12. The auxiliary switch 568 is always open when the apparatus 28 is in operation, as will be explained. The line wires from a source of electrical energy are designated 570 and 572, the wire 570 leads to one contact of the switch 568, and the wire 572 leads to the motor 42. Numeral 574 designates a lead from line wire 570 to one contact of switch 566; numeral 576 designates a lead from the second contact of switch 566 to one contact of switch 558; numeral 578 indicates a lead from the second contact of switch 568 to one contact of the switch 560; numeral 580 designates a lead from line wire 572 to the clock motor 550; numeral 582 designates a lead from said clock motor to the second contact of switch 560; numeral 584 indicates a lead from the second contact of switch 558 to motor 42; numeral 586 designates a lead into the wire 578 from the solenoid of the master valve 43; and numeral 588 is applied to a lead connecting said solenoid into the line wire 572.

For purposes of identification in the description of the operation to follow, reference numerals have been applied to those conduits of the air control system shown in Figure 11 that have not been heretofore identified, as follows: air pressure delivery line 482; trunk lines 484 and 486; branch lines 490 and 492 that are in communication with trunk line 484; and branch lines 494 and 496 that are in communication with trunk line 486.

*Operation*

It is understood that the containers C being delivered to the machine 59 contain the proper quantity of pasteurized cream at a temperature of 36° Fahrenheit. It is also understood that the gas being delivered to manifold 226 via line 256 is a mixture of approximately 85 per cent nitrous oxide, and 15 per cent carbon dioxide at approximately 90 pounds pressure.

Further, with valve 56 open, it is assumed that air under pressure is being delivered to the master valve 43; that conveyors 60 and 388 are being driven longitudinally across the machine as indicated by the arrows in Figure 1; that main switch 566 and auxiliary switch 568 are open, in consequence of which the timer 55, the motor 42, and the solenoid of the master valve 43 are not operating; that the cam plate 552 on the clock motor shaft 556 is in the position thereof demonstrated in Figure 11; and that consequently the cam plate 554 is likewise in the position thereof demonstrated in said figure.

Under these conditions, air under pressure is being delivered from the master valve 43 via trunk line 484 to the cylinder 54, and simultaneously via branch lines 536, 490, and 492 to the cylinders 500, 50, and 52. Thus at this time, piston rods 110, 164, and 350 are in their extended position, whereas piston rod 508 is in its retracted position. As a result, the hammer element 514 is in position to impinge against the flat face 546 of the cam element 540 whereby to effect a 180 degree rotation of said cam as will appear; segmental gear 114 is maintaining the loading mechanism 32 in the inactive position thereof demonstrated for example in Figures 3 and 4; container guide plate 160 is being maintained in the elevated position also demonstrated for example in Figures 3 and 4; and manifold 226 occupies the lowered position thereof likewise shown in these views.

As hereinbefore noted, the machine 59 is designed to process ten containers per cycle of operation. To this end, the ten arcuate recesses 140 of the loader bar 138 are so spaced that each of them will engage a peripheral portion of one container C, whenever the rocker arms 134 are caused to move from the full line to the broken line position thereof portrayed in Figure 4.

The leading container C of the incoming row having arrived at the abutment 76, succeeding containers are brought into contiguous relation relatively one another, the plates of conveyor 60 sliding beneath those containers which have assumed a stationary status, as is understood, and guide plates 158 and 160 serving to maintain the containers in alignment.

Assuming now that the attendant closes switch 566, clock motor 550 will be energized via line 570, lead 574, lead 576, lead 582, lead 580 and line 572. As indicated earlier, the clock motor shaft 556 completes one revolution in twenty seconds, so that the cam plates 552 and 554 rotate simultaneously through 18 degrees of circular movement per second. Consequently, with the disposition of said plates relatively to one another being as demonstrated, an elapse of one-half second takes place immediately following the energization of the clock motor, during which interval the lobe 564 is closing the switch 560. Immediately the switch 560 is closed, the solenoid of the master valve is energized via lead 582 from the closed clock circuit, lead 578, lead 586, lead 588, and line 572. As a result, the air pressure being delivered to the master valve is cut off from trunk line 484 and transferred to trunk line 486 and its branch lines 538, 494, and 496. In consequence, during an elapse of three seconds during which the lobe 564 maintains the switch 560 closed as the cam plate 554 revolves through 54 degrees of movement, the piston rod 508 of cylinder 500 is extended, and the piston rods 110, 164, and 350 are retracted.

It is noted that during the thus far described elapse of three and one-half seconds, the motor is not operating, although as understood, cam plate 552 is revolving concurrently with cam plate 554. In the three second interval during which the switch 560 is closed, the four piston rods, respectively associated with the cylinders 500, 50, 52, and 54, raise manifold 226 to the position thereof demonstrated by broken lines in Figure 4; rotate segmental gear 114 to bring the loading mechanism 32 to the broken line position thereof also shown in Figure 4; retract or lower guide plate 160 to a plane wherein the upper edge thereof is slightly below the upper surface of conveyor 60; and cause the hammer element 514 to strike against the flat face 546 of the lug 544, in the event the driving motor 42 had stopped on "dead center" at the completion of the preceding twenty second cycle of operations. In other words, it is to be borne in mind that only occasionally does the crank shaft 438 come to rest with the cam element 540 in the disposition thereof illustrated in Figures 10 and 11. However, the piston rod 508 of cylinder 500 is extended as described each time the switch 560 is closed, whereby to positively insure the co-planar disposition of the bed member upper surface with the corresponding surfaces of conveyors 60 and 388, even though the motor 42 should happen to come to rest at "dead center," in which event the weight distribution of the agitation mechanism would be ineffectual.

Inasmuch as the results set forth in the preceding paragraph are effected in the space of three seconds, the action would seem to be simultaneous. There is however, a definite sequence of action, the air pressure system being so arranged that (with motor 42 not operating), the following sequence of operations are had: cylinder 54 effects the elevation of manifold 226; while the manifold 226 is rising, cylinder 52 lowers the guide plate 160; then cylinder 500 places the bed member 182 in proper disposition in the event the weight distribution of the agitation mechanism has not automatically done so; and thereupon cylinder 50 activates the loading mechanism 32.

Thus, as the lobe 564 of cam plate 554 approaches the end of its switch 560 closing travel: the upper surface of bed member 182 has been disposed flush with the corresponding surfaces of the two conveyors 60 and 388; and the loading mechanism has moved rearwardly, that is to the left as viewed in Figure 4, each of the recesses 140 of bar 138 engaging against a peripheral portion of one of the ten containers C, whereby all ten containers were simultaneously transferred from the conveyor 60 onto the bed plate 182. The stroke of the arms 134 is regulated by the movement of the piston rod 110, so that the containers C are moved from the full line position shown in Figure 4, to the illustrated broken line position thereof, and no further. Longitudinal disalignment of the ten containers is obviated by the abutments 184.

Instantaneously following the completion of this loading stroke, the cam plate lobe 564 becomes ineffective as a result of which the switch 560 begins to open, and does so in one half of a second. In consequence, the solenoid of the master valve 43 is de-energized, whereby the air pressure being supplied thereto via line 482 is transferred to the conduit 484. Thereupon in the order named, cylinder 54 lowers the manifold 226 into the position thereof shown for example in Figure 5; cylinder 52 raises the guide plate 160; cylinder 500 retracts device 514; and cylinder 50 simultaneously withdraws the loading mechanism 32.

It is observed with reference to Figure 12, that during this entire elapse of four seconds, the switch 558 has remained open, because of the disposition of the lug 564 relatively to that of the recess 562. Immediately following the withdrawal of the loading mechanism however, switch 558 closes, thus establishing a circuit via line 570, lead 574, switch 566, lead 576, said switch 558, lead 584, motor 42, and line 572. Actually, the motor 42 is energized just as the recessed edge of the loading bar 138 passes beyond the guide plate 160.

The precise manner in which the various air cylinders effect the movements thus far described should be apparent from the drawings, and has also been set forth in detail in the prior disclosures aforesaid.

Reverting now to that point in the operation at which the manifold 226 descends onto the ten containers aligned on the bed member, sealed fluid communication is established between said manifold and said containers, as described in detail and at length in the said Patent No. 2,594,492. As a result, gas under pressure is injected into each container. At the precise moment that manifold 226 attains its downmost position, the switch 558 closes, whereupon rapid reciprocation of the ten containers is initiated and continues for sixteen seconds, as the cam plate 552 revolves through 288 degrees of movement.

Thus the original turbulence engendered by the injection of gas is continued by the rapid reciprocations of the containers as the eccentric portion 456 of shaft 438 activates the connecting rod 220. Following an elapse of sixteen seconds, the cam plates 552 and 554 will again have arrived at the dispositions thereof illustrated in Figure 12, for a repetition of the operating cycle. In this connection it is noted that during the reciprocating action, the conveyor 60 has lined up another batch of ten containers in preloading disposition, as demonstrated in Figure 5 by the right hand broken line portrayed container C.

Now, as the cycle of operations previously explained is repeated, the ten containers aligned on said conveyor 60 are loaded onto bed member 182, displacing the processed containers which are simultaneously transferred to the discharge conveyor 388.

From the foregoing description augmented by an inspection of the drawings, it should be evident that the present invention provides improved means for controlling the action of the apparatus comprehensively disclosed in Patent No. 2,594,492.

It should also be manifest, that the incorporation of the unit 61 in the compressed air system, and the provision of the cam-shaped element 540 on the shaft 438, serve to assure smooth container loading and transfer operations. In this connection, attention is directed to the configuration of the hammer member 514, and the manner in which it is mounted, as seen to best advantage in Figure 10. As there indicated by the arrow, the shaft 438 and the element 540 thereon rotate in a counterclockwise direction when the motor 42 is in operation. Assuming now, that when switch 558 opens, said motor should stop on "dead center" with the lug 544 in the position shown, the impact of the hammer against the lug 544 will positively cause the shaft 438 to revolve further in a counterclockwise direction, thereby to insure the co-planar disposition of the bed member relatively to the conveyors, as should now be clear. The pivotal mounting of the hammer member 514 by means of the pin 522, and the interdisposition of the compression spring between said member and the block 506 serve to prevent injury to the air cylinder shaft 508 at all times. Thus whenever the hammer member impinges against the lug 544, the compression spring 534 will absorb the impact shock. Proper disposition of the hammer member is assured by the lateral extension 510 of the block, said extension being slidable along the vertical leg segment 512 of the angle member 504 whereby to obviate any rotary movement of the piston rod. In the event that in consequence of malfunctioning of the switch 558, or for any other reason, the motor 42 should continue in operation after the hammer 514 has been extended, the lug 544 would ride along the bevelled face 524 to swing said hammer in a clockwise direction about the pivot pin 522, and against the force of compression spring 534.

Should it happen that the last recited event does occur, the attendant quickly opens the first manual switch 566, thereby effecting the cessation of all operations in so far as the machine 59 is concerned. The independently driven conveyors 60 and 388 preferable having been stopped, the attendant may now operate the air system independently by closing and opening the second manual switch. Closing of switch 568 energizes the solenoid of the master valve 43 via line 570, said switch, leads 578, 586, and 588, and line 572. Assuming now that the cause resulting in the malfunctioning has been ascertained and rectified, the switch 568 is opened, followed by the closing of the switch 566. Thereupon, the conveyors may be set in motion, and normal operations may be resumed.

What I claim is:

1. In combination with apparatus of the character described including a machine for reciprocating a plurality of containers partially filled with a predetermined quantity of pasteurized cream simultaneously with the injection thereinto of a gas under predetermined pressure, a plate type conveyor for delivering said containers to the machine, a bed member normally flush with the upper surface of the conveyor, air cylinder operable mechanism for transferring a plurality of containers from said conveyor onto said bed member, gas injection mechanism including a sealed manifold whereon a plurality of injection assemblies is mounted, air cylinder operable mechanism for alternately lowering and elevating said manifold and the gas injection assemblies into and out of engagement respectively with the upper end of each of said containers, a rotatable shaft supported in spaced hanger bearings and having an eccentric portion integrally formed therewith, a connecting rod the lower end of which is mounted on said eccentric portion and the upper end of which is pivotally connected to said bed member, and a main motor having a driving connection with said rotatable shaft to effect the intermittent rotation thereof: a compressed air system including a master valve for operating said air cylinder mechanisms; a solenoid for activating the master valve; an electrical circuit including a timer device for alternately energizing said motor and said solenoid; a first manual switch adapted when closed to place the entire circuit in operative condition; and a second manual switch adapted when closed, with the first switch open, to place only the solenoid-energizing portion of the circuit in operative condition.

2. The construction set forth in claim 1, wherein the timer device includes: a clock motor having a projecting shaft that completes one revolution in twenty seconds; a first switch to automatically effect the energization of said main motor; a second switch to automatically effect the energization of said solenoid; a first cam plate rigid with said projecting clock shaft for maintaining the first switch closed during sixteen seconds of each revolution of said shaft; and a second cam plate rigid with said projecting clock shaft for maintaining the second switch closed during three seconds of each revolution of said shaft, said cam plates being so designed as to provide for an elapse of one half second immediately prior to the closing of, and immediately subsequent to the opening of said first switch.

3. In combination with apparatus of the character described including a machine for reciprocating a plurality of containers partially filled with a predetermined quantity of pasteurized cream simultaneously with the injection thereinto of a gas under predetermined pressure, a plate type conveyor for delivering said containers to the machine, a bed member normally flush with the upper surface of the conveyor, air cylinder operable mechanism for transferring a plurality of containers from said conveyor onto said bed member, gas injection mechanism including a sealed manifold whereon a plurality of injection assemblies is mounted, air cylinder operable mechanism for alternately lowering and elevating said manifold and the gas injection assemblies into and out of engagement respectively with the upper end of each of said containers, a rotatable shaft supported in spaced hanger bearings and having an eccentric portion integrally formed therewith, a connecting rod the lower end of which is mounted on said eccentric portion and the upper end of which is pivotally connected to said bed member, and a main motor having a driving connection with said rotatable shaft to effect the intermittent rotation thereof: a cam-shaped element having a projecting lug integrally formed thereon rigidly secured to that end of said shaft opposite the drive connection end thereof; and an air pressure operated unit supported from the machine in alignment with said cam-shaped element, said unit including an alternately extensible and retractible hammer member adapted to strike said projecting lug whenever said shaft comes to rest with the lug in the operating path of said hammer member.

4. The construction set forth in claim 3 wherein the recited hammer member is pivotally mounted in a recessed block rigid with the projecting end of an air cylinder piston rod included in said unit, and wherein a compression spring is interposed between a portion of said block and a portion of said hammer member.

References Cited in the file of this patent

UNITED STATES PATENTS

| Number | Name | Date |
|---|---|---|
| 1,800,465 | Miller et al. | Apr. 14, 1931 |
| 2,239,090 | Everett | Apr. 22, 1941 |
| 2,403,073 | Geiger et al. | July 2, 1946 |
| 2,594,492 | Pfeiffer et al. | Apr. 29, 1952 |